United States Patent [19]

Gharavi

[11] Patent Number: 4,613,948
[45] Date of Patent: Sep. 23, 1986

[54] CONDITIONAL QUANTIZATION GREY LEVEL AND COLOR IMAGE CODING APPARATUS

[75] Inventor: Hamid Gharavi, Middletown Township, Monmouth County, N.J.

[73] Assignee: Bell Communications Research, Inc., Livingston, N.J.

[21] Appl. No.: 616,073

[22] Filed: Jun. 1, 1984

[51] Int. Cl.$^4$ .......................... H04N 7/12; H04N 1/40
[52] U.S. Cl. ..................................... 364/526; 358/260; 358/261; 382/52
[58] Field of Search ................ 340/727, 728; 358/283, 358/282, 260, 261; 364/526; 382/52, 53

[56] References Cited

U.S. PATENT DOCUMENTS

| | | | |
|---|---|---|---|
| 3,813,485 | 5/1974 | Arps | 358/261 |
| 4,023,165 | 5/1977 | Holt et al. | 340/728 X |
| 4,090,243 | 5/1978 | Kotera et al. | 364/526 |
| 4,095,216 | 6/1978 | Spicer | 340/728 |
| 4,280,114 | 7/1981 | Bacon | 358/283 X |
| 4,286,329 | 8/1981 | Goertzel et al. | 340/728 X |
| 4,325,085 | 4/1982 | Gooch | 358/260 X |
| 4,386,366 | 5/1983 | Mori | 358/260 X |
| 4,420,771 | 12/1983 | Pirsch | 358/261 |
| 4,520,395 | 5/1985 | Abe | 358/282 X |
| 4,542,527 | 9/1985 | Tsunekawa | 382/52 |
| 4,555,802 | 11/1985 | Fedak et al. | 340/728 |
| 4,578,704 | 3/1986 | Gharavi | 358/260 |

OTHER PUBLICATIONS

U.S. patent application Ser. No. 505,885, filed Jun. 20, 1983 by H. Gharavi.
IEE Proc., vol. 127, Pt. F, No. 5, Oct. 1980, pp. 405-409.

Primary Examiner—Parshotam S. Lall
Assistant Examiner—Joseph L. Dixon
Attorney, Agent, or Firm—James W. Falk; Stephen M. Gurey

[57] ABSTRACT

In the transmission of PCM coded picture elements (pels), the level value of each pel of an image is quantized in accordance with one-of-a-plurality of quantization schemes that is determined by the quantized level values of adjacent neighbor pels. Each of the quantization schemes is configured from the relative frequency of occurrence of each pel level value for a given combination of neighbor pel level values. Various embodiments may involve grey-level values of each pel of an image, the three-dimensional red, green and blue level values of an image quantized in accordance with a three-dimension quantization scheme determined by the three-dimensional quantized level values of adjacent neighbor pels, or three-dimensional color values that a prequantizer quantizes and linearizes into one-dimension that are then conditionally quantized using one-dimensional grey-level techniques.

19 Claims, 9 Drawing Figures

A = CURRENT PEL
B = NEIGHBOR B
C = NEIGHBOR C
X = OTHER PELS IN 5X5 WINDOW
— = OTHER PELS NOT IN 5X5 WINDOW

FIG. 3

FREQUENCIES OF OCCURENCE OF AN ENSEMBLE OF 16-LEVEL IMAGES

| C | B | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|----|----|----|----|----|----|
| 0 | 0 | 69 | 202 | 134 | 37 | 16 | 2 | 5 | 3 | 4 | 1 | 4 | 0 | 0 | 0 | 0 | 8 |
| 0 | 1 | 231 | 189 | 1 | 49 | 17 | 4 | 0 | 0 | 0 | 0 | 0 | 0 | 0 | 0 | 0 | 0 |
| 0 | 2 | 15 | 71 | 171 | 59 | 14 | 4 | 2 | 1 | 0 | 0 | 2 | 0 | 0 | 0 | 0 | 0 |
| 0 | 3 | 162 | 177 | 118 | 169 | 35 | 5 | 0 | 1 | 1 | 0 | 0 | 0 | 0 | 0 | 0 | 0 |
| 0 | 4 | 39 | 32 | 35 | 48 | 99 | 20 | 2 | 2 | 0 | 0 | 0 | 0 | 0 | 0 | 0 | 0 |
| 0 | 5 | 138 | 61 | 23 | 14 | 16 | 29 | 6 | 0 | 0 | 1 | 0 | 0 | 0 | 0 | 0 | 0 |
| 0 | 14 | 165 | 92 | 3 | 1 | 0 | 0 | 1 | 0 | 0 | 0 | 0 | 0 | 0 | 0 | 0 | 0 |
| 0 | 15 | 1 | 1 | 0 | 0 | 0 | 2 | 1 | 4 | 1 | 0 | 2 | 0 | 0 | 1 | 0 | 3 |
| 1 | 0 | 3 | 253 | 59 | 147 | 68 | 27 | 16 | 4 | 2 | 2 | 0 | 0 | 0 | 0 | 0 | 4 |
| 1 | 1 | 11 | 35 | 5 | 189 | 61 | 22 | 13 | 6 | 2 | 0 | 0 | 1 | 1 | 0 | 0 | 0 |
| 1 | 2 | 109 | 40 | 150 | 37 | 59 | 29 | 8 | 5 | 2 | 0 | 1 | 0 | 0 | 0 | 0 | 0 |
| 1 | 3 | 198 | 87 | 154 | 249 | 94 | 20 | 15 | 6 | 1 | 1 | 0 | 0 | 0 | 0 | 0 | 0 |
| 15 | 12 | 0 | 0 | 0 | 0 | 0 | 0 | 0 | 0 | 0 | 0 | 0 | 0 | 0 | 0 | 0 | 0 |
| 15 | 13 | 0 | 0 | 0 | 0 | 0 | 1 | 0 | 0 | 0 | 8 | 0 | 0 | 0 | 2 | 0 | 2 |
| 15 | 14 | 0 | 0 | 0 | 0 | 0 | 0 | 2 | 0 | 0 | 0 | 0 | 0 | 0 | 0 | 14 | 6 |
| 15 | 15 | 0 | 0 | 0 | 0 | 0 | 0 | 1 | 1 | 0 | 1 | 0 | 1 | 0 | 5 | 3 | 28 |

| C | B | ROM OUTPUT | | | |
|---|---|---|---|---|---|
| | | 00 | 01 | 11 | 10 |
| 0 | 0 | 0↔0 / 0 | 1↔1 / 1 | 2↔6 / 2 | 7↔15 / 11 |
| 0 | 1 | 0↔0 / 0 | 1↔2 / 1 | 3↔3 / 3 | 4↔15 / 4 |
| 0 | 2 | 0↔0 / 0 | 1↔1 / 1 | 2↔3 / 2 | 4↔15 / 5 |
| 0 | 3 | 0↔0 / 0 | 1↔1 / 1 | 2↔2 / 2 | 3↔15 / 3 |
| 0 | 14 | 0↔0 / 0 | 1↔1 / 1 | 2↔4 / 2 | 5↔15 / 6 |
| 0 | 15 | 0↔5 / 3 | 6↔8 / 7 | 9↔12 / 10 | 13↔15 / 15 |
| 1 | 0 | 0↔1 / 1 | 2↔2 / 2 | 3↔4 / 3 | 5↔15 / 6 |
| 1 | 1 | 0↔2 / 1 | 3↔3 / 3 | 4↔5 / 4 | 6↔15 / 7 |
| 15 | 12 | 0↔1 / 0 | 2↔2 / 2 | 3↔3 / 3 | 4↔15 / 4 |
| 15 | 13 | 0↔7 / 5 | 8↔11 / 9 | 12↔14 / 13 | 15↔15 / 15 |
| 15 | 14 | 0↔4 / 3 | 5↔10 / 6 | 11↔14 / 14 | 15↔15 / 15 |
| 15 | 15 | 0↔10 / 7 | 11↔13 / 13 | 14↔14 / 14 | 15↔15 / 15 |

LEGEND
INPUT LEVEL
LOW ← BETWEEN → HIGH
QUANTIZED LEVEL

| C | | | B | | | ROM OUTPUT | | | | | | | | | | | |
|---|---|---|---|---|---|---|---|---|---|---|---|---|---|---|---|---|---|
| | | | | | | 00 | | | 01 | | | 11 | | | 10 | | |
| | | | | | | $Q_1$ | | | $Q_2$ | | | $Q_3$ | | | $Q_4$ | | |
| R | G | B | R | G | B | R | G | B | R | G | B | R | G | B | R | G | B |
| 0 | 1 | 2 | 1 | 0 | 0 | 0 | 0 | 0 | 2 | 2 | 1 | 2 | 2 | 2 | 2 | 2 | 3 |
| 0 | 1 | 2 | 1 | 0 | 1 | 2 | 2 | 2 | 2 | 2 | 3 | 1 | 1 | 1 | 0 | 0 | 0 |
| 0 | 1 | 2 | 1 | 0 | 2 | 2 | 2 | 3 | 1 | 1 | 1 | 0 | 0 | 0 | 1 | 1 | 3 |
| 0 | 1 | 2 | 1 | 0 | 3 | 2 | 2 | 3 | 1 | 1 | 1 | 0 | 0 | 0 | 1 | 1 | 3 |
| 0 | 1 | 2 | 1 | 1 | 0 | 1 | 1 | 1 | 0 | 0 | 0 | 1 | 1 | 3 | 2 | 2 | 2 |
| 0 | 1 | 2 | 1 | 1 | 1 | 1 | 1 | 3 | 2 | 2 | 2 | 2 | 2 | 1 | 1 | 2 | 1 |
| 0 | 1 | 2 | 1 | 1 | 2 | 1 | 2 | 1 | 2 | 2 | 2 | 0 | 0 | 0 | 1 | 1 | 1 |
| 0 | 1 | 2 | 1 | 1 | 3 | 1 | 1 | 1 | 2 | 2 | 2 | 1 | 2 | 2 | 2 | 2 | 1 |
| 0 | 1 | 2 | 1 | 2 | 0 | 1 | 1 | 1 | 2 | 2 | 2 | 1 | 2 | 2 | 2 | 2 | 1 |
| 0 | 1 | 2 | 1 | 2 | 1 | 2 | 2 | 2 | 1 | 2 | 2 | 2 | 2 | 1 | 2 | 2 | 1 |
| 0 | 1 | 2 | 1 | 2 | 2 | 2 | 2 | 1 | 1 | 1 | 0 | 0 | 0 | 1 | 1 | 1 | 3 |
| 0 | 1 | 2 | 1 | 2 | 3 | 1 | 1 | 3 | 0 | 1 | 1 | 2 | 2 | 0 | 3 | 0 | 2 |
| 0 | 1 | 2 | 1 | 3 | 0 | 3 | 0 | 2 | 2 | 2 | 3 | 0 | 0 | 0 | 0 | 1 | 1 |
| 0 | 1 | 2 | 1 | 3 | 1 | 3 | 0 | 2 | 2 | 2 | 3 | 0 | 0 | 0 | 0 | 1 | 1 |
| 0 | 1 | 2 | 1 | 3 | 2 | 3 | 0 | 2 | 2 | 2 | 3 | 0 | 0 | 0 | 0 | 1 | 1 |
| 0 | 1 | 2 | 1 | 3 | 3 | 2 | 2 | 3 | 0 | 0 | 0 | 0 | 1 | 1 | 0 | 0 | 1 |
| 0 | 1 | 2 | 2 | 0 | 0 | 1 | 1 | 1 | 1 | 1 | 1 | 0 | 1 | 1 | 0 | 0 | 1 |
| 0 | 1 | 2 | 2 | 0 | 1 | 0 | 1 | 1 | 0 | 0 | 1 | 0 | 0 | 0 | 1 | 1 | 1 |
| 0 | 1 | 2 | 2 | 0 | 2 | 0 | 0 | 1 | 0 | 0 | 0 | 1 | 1 | 1 | 0 | 1 | 0 |
| 0 | 1 | 2 | 2 | 0 | 3 | 0 | 0 | 1 | 0 | 0 | 0 | 1 | 1 | 1 | 0 | 1 | 0 |

| C | B | ROM OUTPUT 00 | 01 | 11 | 10 |
|---|---|---|---|---|---|
| 1 | 21 | 0↔2 / 0 | 3↔12 / 4 | 13↔24 / 21 | 25↔63 / 27 |
| 1 | 22 | 0↔1 / 1 | 2↔3 / 2 | 4↔9 / 5 | 10↔63 / 14 |
| 1 | 23 | 0↔1 / 1 | 2↔5 / 2 | 6↔19 / 9 | 20↔63 / 30 |
| 1 | 24 | 0↔3 / 3 | 4↔12 / 4 | 13↔34 / 18 | 35↔63 / 51 |
| 1 | 25 | 0↔6 / 2 | 7↔17 / 10 | 18↔25 / 25 | 26↔63 / 26 |
| 1 | 26 | 0↔2 / 1 | 3↔9 / 4 | 10↔20 / 15 | 21↔63 / 26 |
| 1 | 27 | 0↔6 / 2 | 7↔14 / 10 | 15↔23 / 19 | 24↔63 / 27 |
| 1 | 28 | 0↔1 / 1 | 2↔4 / 2 | 5↔20 / 7 | 21↔63 / 34 |
| 1 | 29 | 0↔3 / 1 | 4↔6 / 5 | 7↔17 / 8 | 18↔63 / 27 |
| 1 | 30 | 0↔1 / 1 | 2↔9 / 2 | 10↔32 / 17 | 33↔63 / 48 |
| 1 | 31 | 0↔2 / 1 | 3↔7 / 3 | 8↔28 / 11 | 29↔63 / 46 |
| 1 | 32 | 0↔2 / 1 | 3↔5 / 3 | 6↔20 / 8 | 21↔63 / 32 |
| 1 | 33 | 0↔8 / 3 | 9↔20 / 14 | 21↔38 / 27 | 39↔63 / 50 |
| 1 | 34 | 0↔1 / 1 | 2↔5 / 2 | 6↔27 / 9 | 28↔63 / 46 |

LEGEND

| INPUT LEVEL | | |
|---|---|---|
| LOW ← | BETWEEN | → HIGH |
| QUANTIZED LEVEL | | |

CONDITIONAL QUANTIZATION GREY LEVEL AND COLOR IMAGE CODING APPARATUS

BACKGROUND OF THE INVENTION

This invention relates to systems for quantizing PCM coded picture elements (pels) of grey level and color images.

To digitally store or transmit grey level pictorial information over digital facilities, the image is subdivided into small picture elements (pels) and the grey level of each pel is encoded. Color images are similarly subdivided and the red (R), green (G) and blue (B) component levels of each pel are individually encoded. Since each image will generally contain a large number of pels and since each pel will generally be encoded into several bits, a substantial amount of storage is required for each image or a substantial amount of transmission time is required. It is therefore desirable to reduce the number of bits into which each pel is encoded. Prior art quantization schemes that quantize the grey level or color components of each pel into a fewer number of levels generally suffer noticeable degradation in the quality of the stored or received image.

SUMMARY OF THE INVENTION

The present invention is directed to image quantization techniques that quantize the level value of each pel of an image into one of a fewer number of level values but that still enable the reconstruction of a high quality image from the quantized pels. In accordance with the invention, the level value of each pel is conditionally quantized in accordance with one-of-a-plurality of quantization schemes that is determined by the level values of predetermined neighbor pels. Each of the plurality of quantization schemes is configured by analyzing an ensemble of image signals of the type being quantized to determine the relative frequency-of-occurrence of each level value given the level values of predetermined neighbor pels. From these relative frequencies-of-occurrence, a quantization scheme that minimizes quantization noise is configured for each combination of neighbor pel level values. Since the set of quantized level values vary from pel-to-pel, the level values of the pels within the reconstructed image are not limited to a small set of quantized level values. Rather, the reconstructed image may have pels that have been quantized at any of the input level values.

Color images that have three components (red, blue and green) and that have three level values associated with each pel are conditionally quantized using a three-dimensional extension of this one-dimensional conditional quantization technique. The three-dimensional level values of each pel are conditionally quantized to a three-dimensional quantized level in accordance with a quantization scheme determined by the three-dimensional level values of neighbor pels. Each three-dimensional quantization scheme is determined by analyzing an ensemble of color images from which for each combination of three-dimensional neighbor pel values, the relative frequencies-of-occurrence of each three-dimensional pel value can be determined and the three-dimensional quantizer configured.

In an alternate technique for quantizing color images, an intermediate non-conditional three-dimensional-to-one-dimensional prequantizer quantizes the three-dimensional pel values and linearizes the resultant quantized three-dimensional pel values into an intermediate set of one-dimensional level values. These intermediate level values are then quantized using the one-dimensional conditional quantization techniques.

BRIEF DESCRIPTION OF THE DRAWING

FIG. 3 is an example of the conditional frequencies of occurrence used to configure the conditional quantizer within FIG. 1;

DETAILED DESCRIPTION

Figure 1:
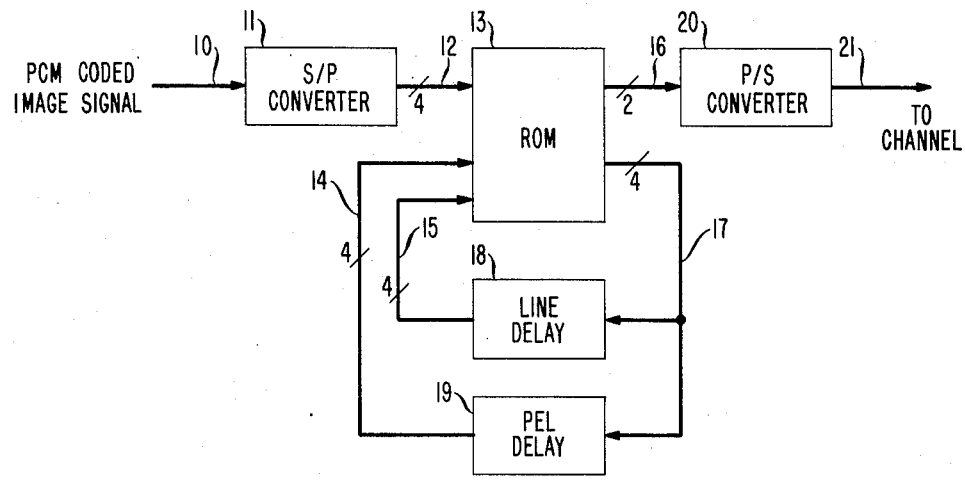
FIG. 1 is a block diagram of a transmitter embodying the principles of the invention.

The transmitter of FIG. 1 receives on lead 10 a serial stream of digital bits that are PCM coded grey levels of successive pels of a sampled photographic image. The PCM code words of each pel may be derived from an analog signal generated by a conventional video scanner (not shown). In the embodiment described herein, each pel is coded into a 4-bit, 16-level PCM binary code word. Serial-to-parallel converter 11 converts the serial bit stream on lead 10 to parallel format on parallel leads 12 (shown for clarity in FIG. 1 as a single lead). Leads 12 are connected to the inputs of a read-only memory (ROM) 13. Also applied to ROM 13 on leads 14 and leads 15 are 4-bit, 16-level PCM representations of the previous adjacent pels of the same image. As will be more fully described, ROM 13 quantizes each successive 4-bit pel on leads 12 to a 2-bit output signal on leads 16, in accordance with a quantizing scheme that is determined by the values of adjoining pels that are simultaneously applied to ROM 13 on leads 14 and 15. Each 2-bit, 4-level pel word generated by ROM 13 on leads 16 is converted at the receiving end of the channel to an image signal having 16-level quality.

In accordance with my invention, a separate near optimum quantizer is incorporated within ROM 13 for each state (i.e., for each combination of adjacent pel level values) that is based on a statistical distribution of pel level values of that state. These statistics are derived by encoding an ensemble of sample photographic grey level images into 4-bits per pel and determining the relative frequency-of-occurrence of each of the 16 level values as a function of the level values of the neighboring pels. Thus, by correlating the level value of a pel with the level value of its adjacent neighbors and employing for each state the probabilistic distribution of pel level values, a quantizer is designed that is statistically adapted to the data within that state. The quantization noise of such a quantizer is thus substantially less than the quantization noise of a quantizer in which quantization levels are uniformly distributed.

Figure 2:
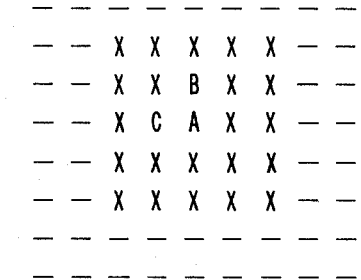
FIG. 2 is a pel map helpful in explaining the operation of the transmitter of FIG. 1.

From an ensemble of 4-bit, 16-level PCM coded grey level images, the frequency-of-occurrence of each level, 0 to 15, is determined for each of the 256 (16×16) combinations of neighboring pel level values. Since the level value of any pel is statistically most closely correlated with its nearest adjoining neighbor pels, the two neighbors of the current pel, designated "A", are the pels that immediately precede the current pel on the current line, referred to as neighbor "C", and the pel that is directly above the current pel in the preceding line, referred to as neighbor "B", as shown in FIG. 2. (Scanning is presumed to be from top-to-bottom, left-to-right.) FIG. 3 illustrates the frequencies-of-occurrences of the 16-levels of pel A for several of the 256 combinations of C and B levels that were obtained from an ensemble of sample grey level images. Within each state the relative frequency-of-occurrence (or probability) of level i is readily calculated as $$p(i/jk) = \frac{f(i/jk)}{\sum_{i=0}^{15} f(i/jk)} \quad (1)$$

where f(i/jk) is the frequency-of-occurrence of level i for C level j and B level k.

A quantizer is designed for each of the 256 states using the 256 distributions of pel level values. In the embodiment being described herein, each 4-bit, 16-level input pel is quantized to a 2-bit, 4-level pel for transmission over the data channel. Accordingly, for each of the 256 states, a 16-level to 4-level quantizer is designed and structurally incorporated in ROM 13.

There are several techniques that can be employed to configure each of the 256 quantizers using the statistical distribution of pel values of each state. In one method, the quantized output level values for each state are selected to be the four most probable level values and each input level is quantized to the nearest quantized output level value. The present embodiment employs Lloyd's general design technique for minimum mean square error in the design of each of the 256 quantizers. This method employs a reiterative process to determine the near optimum quantized levels that will minimize quantization noise. In accordance with this method, the four most probable level values of the 16 level values are initially selected as the quantizer outputs. Four clusters are formed around each of the quantized level values by assigning each of the remaining 12 level values to the cluster having the closest quantized level value. The centroid, or average of each cluster, is determined by first calculating for each level value i within the cluster the following:

$$\frac{\sum_i ip(i/jk)}{\sum_i p(i/jk)} \quad (2)$$

The nearest integer is the centroid of the cluster and is then used as a new quantization level. Using the four centroids as quantization levels, new clusters are formed and the centroids of each are determined. The process is reiterated until the centroids of the clusters and the quantized levels converge. Mapping between 16 input level values and the 4 output quantized level values is thus in accordance with the four clusters.

Figure 4:
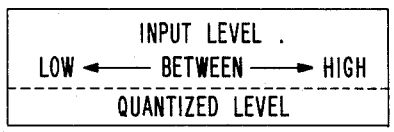
FIG. 4 are some of the conditional quantizers within the transmitter of FIG. 1.

FIG. 4 shows several of the 256 different quantizers that have been derived from the data of FIG. 3. In each state, as per the legend, a current pel input level value between the noted low and high level values is quantized into the output level noted below the dotted line. For example, for CB state "15-13" (i.e., pel C quantized to level 15 and pel B quantized to level 13) the current pel is quantized to 5 if it is between 0 and 7, to 9 if it is between 8 and 11, to 13 if it is between 12 and 14, and to 15 if it is 15. The corresponding 2-bit output of ROM 13 is either "00", "01", "11" or "10", respectively.

With reference again to FIG. 1, ROM 13 stores the 256 quantizer configurations to map each 4-bit, 16-level pel signal on leads 12 to a 2-bit 4-level pel output signal on parallel leads 16, the particular quantizer configuration being determined by the quantized levels of the neighbor pels on leads 14 and 15. Parallel-to-serial converter 20 converts each 2-bit output of ROM 13 on leads 16 to serial format for transmission over the channel 21. In order for the 16-level quantized level values of the neighbor pels to be available to the input of ROM 13, ROM 13 generates on leads 17 a 4-bit, 16-level representation of the quantized output level value in addition to the 2-bit output on leads 16. Therefore, returning to the previous example, ROM 13 also generates on leads 17 either "0101", "1001", "1101" or "1111" representing either level values 5, 9, 13 or 15, respectively. The signal on leads 17 is delayed by pel delay 19 and line delay 18 so that the signals on leads 14 and 15 at the inputs to ROM 13, are the quantized level values of neighbor C and neighbor B, respectively, of the current pel A on leads 12.

It should be noted that the quantized level values of the neighbor pels are used to determine the state of ROM 13 rather than the actual nonquantized neighbor pel level values. As will be obvious from the discussion of the receiver to follow presently, the transmitter and receiver will remain synchronous with each other only if the same inputs are available to a receiver ROM as are used at the transmitter ROM. Since the receiver only has the quantized level values available, the transmitter therefore uses the quantized level values of the neighbor pels to determine the state of ROM 13. Since, by quantizer design, the quantized level values are statistically close to the actual pel level values, the system remains stable.

Figures 5, 7:
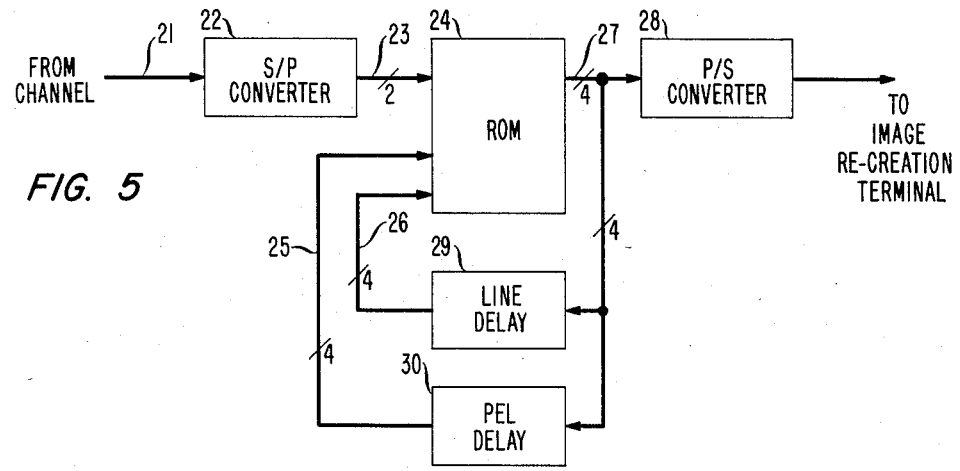
FIG. 5 is a block diagram of a receiver 1 embodying the principles of the invention that processes the signal generated by the transmitter of FIG. 1.
FIG. 7 are some of the conditional quantizers within the transmitter of FIG. 6.

With reference to the receiver of FIG. 5, the serial data bits received from channel 21 are converted to parallel format by serial-to-parallel converter 22. The 2-bit representation on leads 23 of the current received pel is inputted to ROM 24 together with the 4-bit, 16-level representations of the received neighbor pels C and B on leads 25 and 26, respectively. In accordance with the quantized level values of the neighbor pels, ROM 24 maps each 2-bit input into a 4-bit, 16-level output on leads 27 by using the same internally stored mapping relationships of the transmitter ROM 13 that are shown in part in FIG. 4. Thus, as an example, if "11" is received on leads 23, and the quantized level value of neighbor C is 15 and the quantized level value of neighbor B is 13, ROM 24 generates "1101" on leads 27 representing the level value 13. Parallel-to-serial converter 28 converts this signal to serial format to be applied to a terminal for reconstruction into an analog picture element having a grey level value of "13". The line delay 29 and pel delay 30 delay each 4-bit decoded output of ROM 24 so that the inputs to ROM 24 on leads 25 and 26 are the 4-bit, 16-level values of the pels neighboring the current pel on leads 23.

In the embodiment described hereinabove, only 1-of-4 level values is transmitted per pel which is converted at the receiver to one of the original 16 level values. Since for each pel the 1-of-4 transmitted quantized level values are representative of different ones of the 16 original levels, the reconstructed image has an overall quality of 16 level values. A 16-level quality image signal also could have been reconstructed, in an alternate embodiment, from a conditionally quantized 1-bit, 2-level per pel signal, the reconstructed image having, as would be expected, an overall subjective quality less than the 2-bit, 4-level per pel signal. The quality of the 1-bit, 2-level per pel image far exceeds, however, the quality of any 1-bit per pel image signal using techniques not employing the present invention.

My invention may also be employed for conditionally quantizing color images. In a first color image embodiment described hereinbelow, a three-dimensional conditional quantizer quantizes as a single entity the three-dimensional pel level values consisting of a red (R), green (G) and blue (B) component. In a second embodiment, also described hereinafter, a non-conditional three-dimensional prequantizer quantizes the three-dimensional pel signal to linearize into one-dimension the color pel values which then are conditionally quantized using the previously described one-dimensional grey-level techniques.

Figure 6:
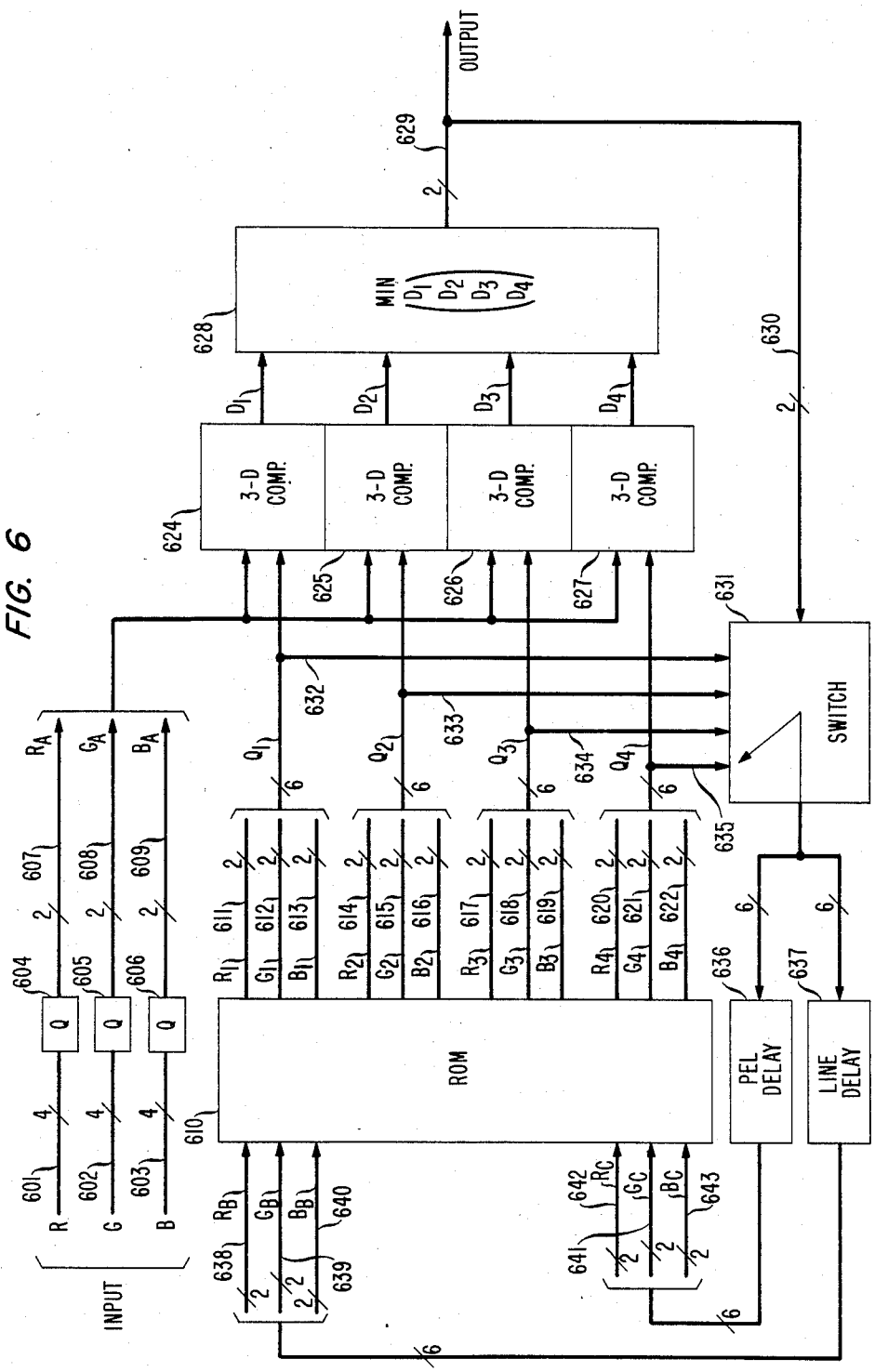
FIG. 6 is a block diagram of an embodiment of a transmitter for color images that embodies the principles of the invention.

The transmitter of FIG. 6, quantizes the 12-bit per pel, 4-bit per R, G and B components on leads 601, 602 and 603 to a 2-bit, 4-level per pel signal for transmission over a digital channel. Each of the components on leads 601, 602, and 603 are PCM coded into 4-bits, 16-levels each, for a total $16^3$ or 4096 possible colors per pel. To quantize conditionally each possible state uniquely, a ROM having 16,777,216 ($[4096]^2$) inputs would be required. Therefore, in order to reduce the size of the ROM the 4-bit R, G and B components of each pel are individually quantized by quantizers 604, 605 and 606, respectively, to remove the least two significant bits of each component. The resultant components $R_A$, $G_A$ and $B_A$ on leads 607, 608 and 609, respectively, are 2-bit, 4-level signals. It should be noted that each lead in FIG. 6 represents a plurality of parallel leads. It will be understood by those skilled in the art, that the components of the transmitter in FIG. 6 operate in parallel format and that no further explanation need be given.

Each 6-bit, 64-level three-dimensional pel signal on leads 607, 608 and 609 is conditionally quantized to a 2-bit, 4-level output signal for transmission over the digital channel. Since each current pel and each neighbor pel has three components, each current pel cannot be conditionally quantized as per the grey-level embodiment previously described but must be quantized in three dimensions. In response to the three-dimensional quantized components $R_B$, $G_B$ and $B_B$ of neighbor pel B and the three-dimensional quantized components $R_C$, $G_C$ and $B_C$ of neighbor pel C, ROM 610 generates on leads 611-622 four sets of three-dimensional quantized outputs $Q_1$, $Q_2$, $Q_3$ and $Q_4$ having component level values $R_1,G_1,B_1$; $R_2,G_2,B_2$; $R_3,G_3,B_3$ and $R_4,G_4,B_4$, respectively, wherein each component of each of the quantized output has 2-bits, 4-levels.

The current pel A on leads 607, 608 and 609 consisting of components $R_A$, $G_A$ and $B_A$ is quantized to one of the four three-dimensional quantized outputs $Q_1$, $Q_2$, $Q_3$ and $Q_4$ by determining to which quantized output it is closest. Three-dimensional comparators 624, 625, 626 and 627 calculate the three-dimensional distances $D_1$, $D_2$, $D_3$ and $D_4$ between the current pel on leads 607, 608 and 609 and the four possible three-dimensional quantized outputs $Q_1$, $Q_2$, $Q_3$ and $Q_4$, respectively, in accordance with the following:

$$D_i = \sqrt{(R_A - R_i)^2 + (G_A - G_i)^2 + (B_A - B_i)^2} \quad (3)$$

for i=1, 2, 3 and 4, and where R, G and B are level values 0 through 3.

Comparator circuit 628 compares the four resultant distances $D_1$, $D_2$, $D_3$ and $D_4$ generated by circuits 624, 625, 626 and 627, respectively, to determine which distance $D_i$ is minimum. The current pel is thus quantized to the $Q_i$ to which it is closest. The quantized output $Q_i$ is represented by a two-bit signal at the output of comparator 628 on leads 629. Accordingly, successive 12-bit, 4096-level input pels on leads 601, 602 and 603 are quantized for transmission into a 2-bit output pel signal on leads 629, wherein each 2-bit output signal represents a particular 1-of-64 colors on leads 607, 608 and 609.

The 2-bit signal on leads 629 is applied via leads 630 to a switch 631 that connects, in response to this signal, the quantized output $Q_i$, via bus 632, 633, 634 or 635, to pel delay circuit 636 and line delay circuit 637 that delay the quantized current pel for one pel interval and one line interval, respectively. The components $R_B$, $G_B$ and $B_B$ on input leads 638, 639 and 640, respectively, of ROM 610 are the components of the quantized neighbor B pel and the components $R_C$, $G_C$ and $B_C$ on input leads 641, 647 and 643, respectively, of ROM 610 are the components of the quantized neighbor C pel.

FIG. 7 illustrates a portion of a 4096 (64×64) entry C and B neighbor pel level values versus the quantized outputs $Q_1$, $Q_2$, $Q_3$ and $Q_4$ for ROM 610. The RGB component level values of the four quantized outputs are shown for each combination of RGB components of neighbor pels C and B, each of the components having four possible level values. In order to determine the configuration of ROM 610 in accordance with this method, the quantized outputs for each of the 4096 states are calculated by employing a 4096-state by 64-color frequency-of-occurrence table that is derived from an ensemble of color images that have been quantized to 64 colors (4-levels per component) per pel. From these sample color images, the conditional frequency of occurrence of each of the 64 colors is calculated for each of the 4096 ($64^2$) combinations of level values of neighbor C and B pels. Within each state, the four locally optimum quantized levels are derived by initially selecting the four most probable sets of RBG level value combinations (colors) among the 64 possible level value combinations (colors). Each of the remaining 60 colors are clustered to one of the four selected colors by calculating from the level value components of each color, to which selected color it is closest using equation (3) as a measure of distance. Once all the clusters are formed, the centroids of each cluster are calculated. For example, if one cluster consists of sets $r_1g_1b_1$, $r_2g_2b_2$ and $r_3g_3b_3$, having relative frequencies of occurrence $p_1$, $p_2$ and $p_3$, respectively, the following are calculated:

$$\frac{r_1p_1 + r_2p_2 + r_3p_3}{p_1 + p_2 + p_3}, \tag{4}$$

$$\frac{g_1p_1 + g_2p_2 + g_3p_3}{p_1 + p_2 + p_3} \text{ and} \tag{5}$$

$$\frac{g_1p_1 + g_2p_2 + g_3p_3}{p_1 + p_2 + p_3}. \tag{6}$$

The components $R_1$, $G_1$ and $B_1$ of the centroid of the cluster are the nearest integers to equations (4), (5) and (6). Once the centroids of each of the four clusters are determined, new clusters are formed. The process is reiterated until the centroids of each cluster converge. The centroids of the four resultant clusters are the optimum quantized outputs for that state as derived from the statistics of an ensemble of sample color images.

At the receiver (not shown, but which is essentially identical in structure to the receiver in FIG. 5), a ROM transforms each 2-bit pel signal into the actual quantized 4-level values per component RGB signal in accordance with a stored mapping transformation table that is identical to that stored in ROM 610. The reconstructed color image thus has an overall 64-color quality although only 2-bits per pel have been transmitted.

In the above described embodiment of FIG. 6, the 4-bit, 16-level R, G and B components of the input pel signal on leads 601, 602 and 603 are each initially uniformly quantized to 2-bits, 4-level values per component reduces the information content of the conditionally quantized signal. In order to preserve a portion of information content of the input signal, in the embodiment of FIG. 8 described hereinafter, the input 12-bit, 4-bit per component pel signal is initially quantized by a nonconditional three-dimensional locally optimum prequantizer that quantizes and transforms the three-dimensional 12-bit input to a one-dimensional, 6-bit, 64-level signal that is then conditionally quantized using the conventional one-dimensional techniques heretofore described in connection with the grey-level embodiment.

Figure 8:
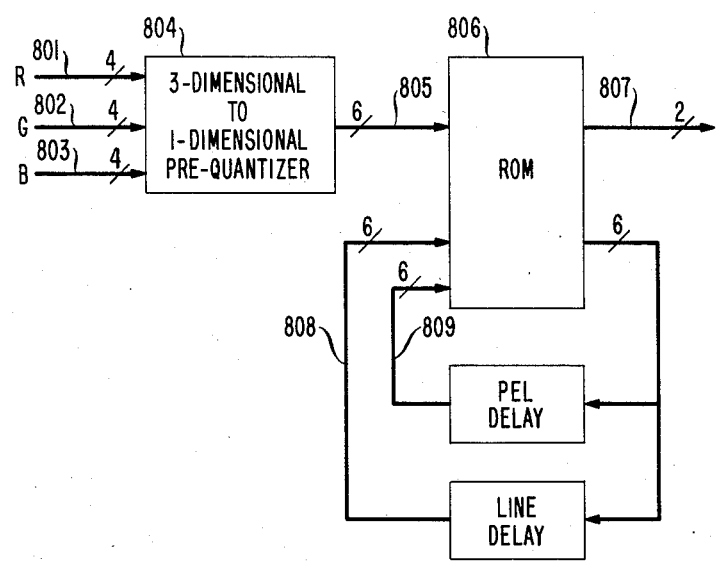
FIG. 8 is a block diagram of another embodiment of a transmitter for color images that embodies the principles of the invention.

With reference to FIG. 8, each current pel on leads 801, 802 and 803 consists of 4-bits, 16-levels per R, G and B component, respectively. A three-dimensional-to-one-dimensional prequantizer 804 nonconditionally quantizes each 12-bit pel to a one-dimensional 6-bit, 64-level value per pel signal. Prequantizer 804 quantizes each of the 4096 ($2^4 \times 2^4 \times 2^4$) input colors directly into one of 64 ($2^6$) colors by employing a nonconditional statistical distribution of pel colors derived from an ensemble of color images that have been coded into 12-bits (4-bits per R, G and B component) per pel. A locally optimum quantizer design is employed to configure the mapping of the 4096 input colors to the 64 quantized output colors. In configuring the quantizer, the 64 colors having the highest probability of occurrence are initially selected as the quantized levels. The remaining 4032 colors are clustered to the nearest quantized color using equation (3) as a measure of distance between colors. Once the 64 clusters are formed, the centroid of each cluster is calculated. The 64 centroids are the new quantized colors from which new clusters are formed. The process is reiterated until the centroids and quantized colors converge.

Once the optimum 64 quantized colors are determined, the 64 colors are arranged to minimize quantization noise by designating as level 0 the quantized color closest to the origin (R, G and B components at their level 0). The quantized level closest to the previously determined level 0 is designated level 1, the quantized color closest to level 1 is designated level 2, etc. Once prequantizer 804 is computationally configured, the ROM that implements this quantization scheme can be programmed. Prequantizer 804 therefore maps each 12-bit, three-dimensional RGB input on leads 801, 802 and 803 into a one-dimensional, 6-bit representation on leads 805.

The 6-bit, 64-level value signal on leads 805 is conditionally quantized to 2-bits, 4-levels per pel using the grey-level conditional quantization techniques heretofore described. The data for configuring the quantizer is derived from an ensemble of 12-bit per pel sample color images that are each prequantized by prequantizer 804 to convert each pel to a one-dimensional, 6-bit, 64-level signal. The conditional statistics of the ensemble of sample images are calculated from which the 4096 ($64 \times 64$) optimum 2-bit, 4-level quantizers are configured using the reiterative clustering technique heretofore described. ROM 806, which is programmed in accordance with these 4096 state quantizers, therefore quantizes each 6-bit, 64-level values pel signals on leads 805 to a 2-bit, 4-level values output on leads 807, the state of ROM 806 being determined from the quantized 6-bit, 64-level pel signal of neighbor pels B and C on leads 808 and 809, respectively.

Figure 9:
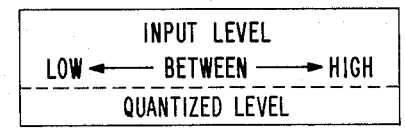
FIG. 9 are some of the conditional quantizers within the transmitter of FIG. 8.

FIG. 9 illustrates a portion of the 4096 entry quantization scheme for ROM 806, which shows that if, for example, the quantized values of neighbor B and neighbor C are 32 and 1, respectively, and the current pel at the output of prequantizer 804 is between level 6 and level 20, the quantized level is 8 that is outputted by ROM 806 on leads 807 as the bit pattern "11".

The receiver is similar in structure to the receiver in FIG. 5 and includes a ROM having the same translation tables stored within as the ROM of quantizer 804 and as ROM 806. This receiver ROM translates each 2-bit received pel signal back to a 6-bit, 64-level value quantized one-dimensional signal and then that signal back to the corresponding three-dimensional RGB signal from which the image can be reconstructed.

Other embodiments may be devised by those skilled in the art without departing from the spirit and scope of the present invention. For example, in a color embodiment, the R, G and B components of the color image could be separately conditionally quantized. Also, the techniques of the present invention are equally applicable in the transmission of real time video signals where, for example, the quantizing scheme could be recalculated prior to each video frame based upon the statistics of the past video frames. Also, the present invention could be applied to quantize nonvideo signals conditionally, as speech.

What is claimed is:

1. Apparatus comprising,
   means for receiving a stream of multilevel input values associated with respective pels of an image, each value associated with a pel being one of a predetermined number of levels, and
   quantizing means comprising a plurality of individual quantization schemes, each of said quantization schemes for quantizing an input value at one of said predetermined number of levels to an output level at one of a fewer predetermined number of levels, said quantizing means quantizing the input value associated with each pel by a particular one of said plurality of quantization schemes, the said particular one of said plurality of quantization schemes being determined for each pel by the level values associated with predetermined ones of its neighbors.

2. The invention of claim 1 wherein each of said quantization schemes is configured from the relative frequency that each level value of a pel is expected to occur given the level values associated with predetermined ones of its neighbors.

3. The invention of claim 2 wherein the level value of each pel is quantized to the closest one of a selected number of values that are the most likely to occur given the level values associated with predetermined ones of its neighbors.

4. The invention of claim 2 wherein the level value of each pel is quantized to the closest one of a selected number of values that are derived from the frequency-of-occurrence of each level to minimize quantization noise.

5. Apparatus comprising
means for receiving a stream of PCM input codewords that each represent a coded one of a first predetermined number of level values of a pel of an image and that each have a first number of bits, and
quantizing and encoding means comprising a plurality of individual quantization schemes, each of said quantization schemes for quantizing and encoding an input codeword representing one of said first predetermined number of level values to an output codeword having a second number fewer than said first number of bits and representing one a second less than said first predetermined number of levels, said quantizing and encoding means quantizing and encoding the input codeword associated with each pel by a particular one of said plurality of quantization schemes, the said particular one of said plurality of quantization schemes being determined for each pel by the coded level values associated with predetermined ones of its neighbors.

6. The invention of claim 5 wherein each of said quantization schemes is configured from the relative frequency that each value of a pel is expected to occur given the level values associated with predetermined ones of its neighbors.

7. The invention of claim 6 wherein the codewords having said second number of bits each represent one of the most likely to occur level values given, for each pel, the level values associated with predetermined ones of its neighbors, and each pel is quantized and encoded as the particular one of said codewords to which its value is closest.

8. The invention of claim 6 wherein said codewords having said second number of bits each represent selected values that are derived from the relative frequency-of-occurrence of each level value to minimize quantization noise given, for each pel, the level values associated with predetermined ones of its neighbors, and each pel is quantized and encoded as the particular one of said codewords to which its is closest.

9. Apparatus comprising,
means for receiving the red (R), green (G) and blue (B) component multilevel values associated with the pels of an image, each component value for each pel being one of a predetermined number of levels and each combination of component values (R, G and B) representing one of a predetermined number of colors, and means for quantizing as a three-dimensional unit the R, G and B components that represent one of said predetermined number of colors and that are associated with each pel to one of a fewer number of predetermined colors, said means for quantizing including means for quantizing in accordance with a particular quantization scheme that is determined by each pel for the color (R, G and B components) associated with predetermined ones of its neighbors.

10. The inventions of claim 9 wherein each of said quantization schemes is configured from the relative frequency that each color (R, G and B component values) of a pel is expected to occur, given the colors (R, G and B component values) associated with predetermined ones of its neighbors.

11. The invention of claim 10 wherein the color (R, G and B component values) of each pel is quantized to the closest one of a selected number of colors that are the most likely to occur given the colors associated with predetermined ones of its neighbors, the distance $D_{ij}$ between a color i ($R_i$, $G_i$ and $B_i$ component values) and color j ($R_j$, $G_j$ and $B_j$ component values) being given by:

$$D_{ij} = \sqrt{(R_i - R_j)^2 + (G_i - G_j)^2 + (B_i - B_j)^2} \ .$$

12. The invention of claim 10 wherein the color (R, G and B component values) of each pel is quantized to the closest one of a selected number of colors that are derived from the relative frequency-of-occurrence of each color to minimize quantization noise, the distance $D_{ij}$ between color i ($R_i$, $G_i$ and $B_i$ component values) and color j ($R_j$, $G_j$ and $B_j$ component values) being given by:

$$D_{ij} = \sqrt{(R_i - R_j)^2 + (G_i - G_j)^2 + (B_i - B_j)^2} \ .$$

13. Apparatus comprising,
means for receiving the red (R), green (G) and blue (B) component multilevel values associated with the pels of an image, each component value for each pel being one of a predetermined number of levels and each combination of component values (R, G and B) representing one of a first predetermined number of colors, means for prequantizing as a three-dimensional unit the R, G and B components representing one of said first predetermined number of colors associated with each pel to a one-dimensional level value representing one of a second predetermined number of colors, said second predetermined number being less than said first predetermined number, and means for quantizing the one-dimensional level value associated with each pel to one of a fewer than said second number of predetermined levels, said means for quantizing including means for quantizing in accordance with a particular quantization scheme that is determined for each pel by the one-dimensional level values associated with predetermined ones of its neighbors.

14. The invention of claim 13 wherein said prequantizer means quantizes the color (R, G and B component values) of each pel to one of said second predetermined number of colors in accordance with a quantization scheme derived from the relative frequency that each color is expected to occur.

15. The invention of claim 14 where the color of each pel is quantized to the closest one of said second predetermined number of colors to minimize quantization noise, the distance $D_{ij}$ between color i ($R_i$, $G_i$ and $B_i$ component values) and color j ($R_j$, $G_j$ and $B_j$ component values) being given by:

$$D_{ij} = \sqrt{(R_i - R_j)^2 + (G_i - G_j)^2 + (B_i - B_j)^2}\ .$$

16. The invention in accordance with claim 13 wherein each of said quantization schemes of said quantizing means is configured from the relative frequencies-of-occurrence of said one-dimensional level values associated with each pel given the one-dimensional level values associated with predetermined ones of its neighbors.

17. The invention in accordance with claim 16 wherein the one-dimensional level values of each pel are quantized to a selected number of values that are derived from the frequencies-of-occurrence of each one-dimensional level value to minimize quantization noise.

18. Apparatus comprising means for receiving a stream of multilevel input values associated with respective samples of a signal, each value associated with a sample being one of a predetermined number of levels, and quantizing means comprising a plurality of individual quantization schemes, each of said quantization schemes for quantizing an input value at one of said predetermined number of levels to an output level at one of a fewer predetermined number of levels, said quantizing means quantizing the input value associated with each present sample by a particular one of said plurality of quantization schemes, the said particular one of said plurality of quantization schemes being determined for each present sample by the level values associated with at least one previous sample, said at least one previous sample and said each present sample having a predetermined relationship between each other.

19. The invention of claim 18 wherein each of said quantization schemes is configured from the relative frequency that each level value of a present sample is expected to occur given the level value associated with said at least one previous sample.

* * * * *

UNITED STATES PATENT AND TRADEMARK OFFICE
CERTIFICATE OF CORRECTION

PATENT NO. : 4,613,948

DATED : September 23, 1986

INVENTOR(S) : Hamid Gharavi

It is certified that error appears in the above-identified patent and that said Letters Patent is hereby corrected as shown below:

In The Specification:

Column 2, line 16, "receiver 1 embodying" should read --receiver embodying--.

Column 3, lines 9, 10, " `` A `` , are the pels that immediately precede" should read --"A", are the pel that immediately precedes--.

Column 7, lines 29, 30, "component reduces" should read --component that reduces--;

line 37, "12-bit input to" should read --12-bit input signal to--.

Column 8, lines 54, 55, "conditionally, as speech" should read --conditionally, such as speech--.

In The Claims:

Column 9, line 60, "which its is closest" should read --which it is closest--.

Column 11, line 8, "Ri" should read --$R_i$--;

line 9, "$R_i$, $G_i$, $B_i$" should read --$R_j$, $G_j$, $B_j$--.

Signed and Sealed this

Twenty-fourth Day of February, 1987

Attest:

DONALD J. QUIGG

Attesting Officer     Commissioner of Patents and Trademarks